(12) United States Patent
Stecker

(10) Patent No.: US 7,485,248 B2
(45) Date of Patent: Feb. 3, 2009

(54) DECORATIVE ARTICLES WITH PORTIONS IN RELIEF AND METHODS OF MAKING SAME

(75) Inventor: William M. Stecker, 1920 Estates La., #5, Shawano, WI (US) 54166

(73) Assignee: William M. Stecker, Shawano, WI (US)

( * ) Notice: Subject to any disclaimer, the term of this patent is extended or adjusted under 35 U.S.C. 154(b) by 598 days.

(21) Appl. No.: 11/099,008

(22) Filed: Apr. 5, 2005

(65) Prior Publication Data

US 2006/0222818 A1    Oct. 5, 2006

(51) Int. Cl.
  *B29C 43/02*    (2006.01)
(52) U.S. Cl. ............... 264/112; 264/120; 264/122; 264/126; 264/245; 264/246; 264/247
(58) Field of Classification Search .......... None
  See application file for complete search history.

(56) References Cited

U.S. PATENT DOCUMENTS

| | | | | |
|---|---|---|---|---|
| 2,039,488 A | * | 5/1936 | McDonald | ........ 264/112 |
| 3,336,244 A | * | 8/1967 | Rockoff | ........ 521/135 |
| 4,093,694 A | * | 6/1978 | Browning | ........ 264/246 |
| 4,880,588 A | | 11/1989 | Brault et al. | |
| 4,895,690 A | | 1/1990 | LaRoche et al. | |
| 4,959,401 A | | 9/1990 | Bellasalma et al. | |
| 5,049,432 A | * | 9/1991 | Ooms et al. | ........ 428/159 |
| 5,166,230 A | | 11/1992 | Stecker | |
| 6,238,609 B1 | | 5/2001 | Stecker | |
| 6,348,168 B1 | * | 2/2002 | Lowrance et al. | ........ 264/112 |
| 6,479,005 B1 | * | 11/2002 | Hsien | ........ 264/219 |

FOREIGN PATENT DOCUMENTS

| | | |
|---|---|---|
| EP | 0 667 249 A1 | 8/1995 |
| GB | 781377 A | 8/1957 |

OTHER PUBLICATIONS

International Search Report and Written Opinion of the International Searching Authority for International Application No. PCT/US2006/009723, mailed Aug. 8, 2006.

* cited by examiner

*Primary Examiner*—Mary Lynn F Theisen
(74) *Attorney, Agent, or Firm*—Myers Bigel Sibley & Sajovec, P.A.

(57) ABSTRACT

A decorative article of manufacture includes a substrate having a surface of thermoplastic material and one or more relief portions extending from the substrate surface. The one or more relief portions are formed from a blend of powdered thermoplastic material and powdered non-thermoplastic material, wherein the powdered non-thermoplastic material is selected from the group consisting of metals, glass, minerals, and combinations thereof, wherein the powdered thermoplastic material is fused together and to the substrate thermoplastic material.

26 Claims, 12 Drawing Sheets

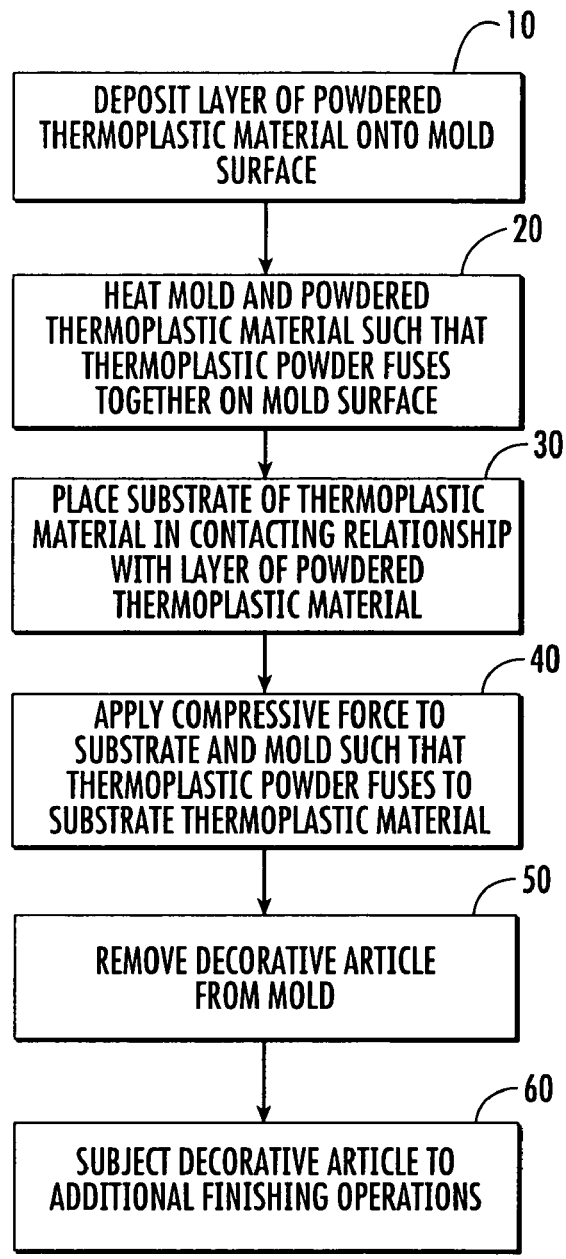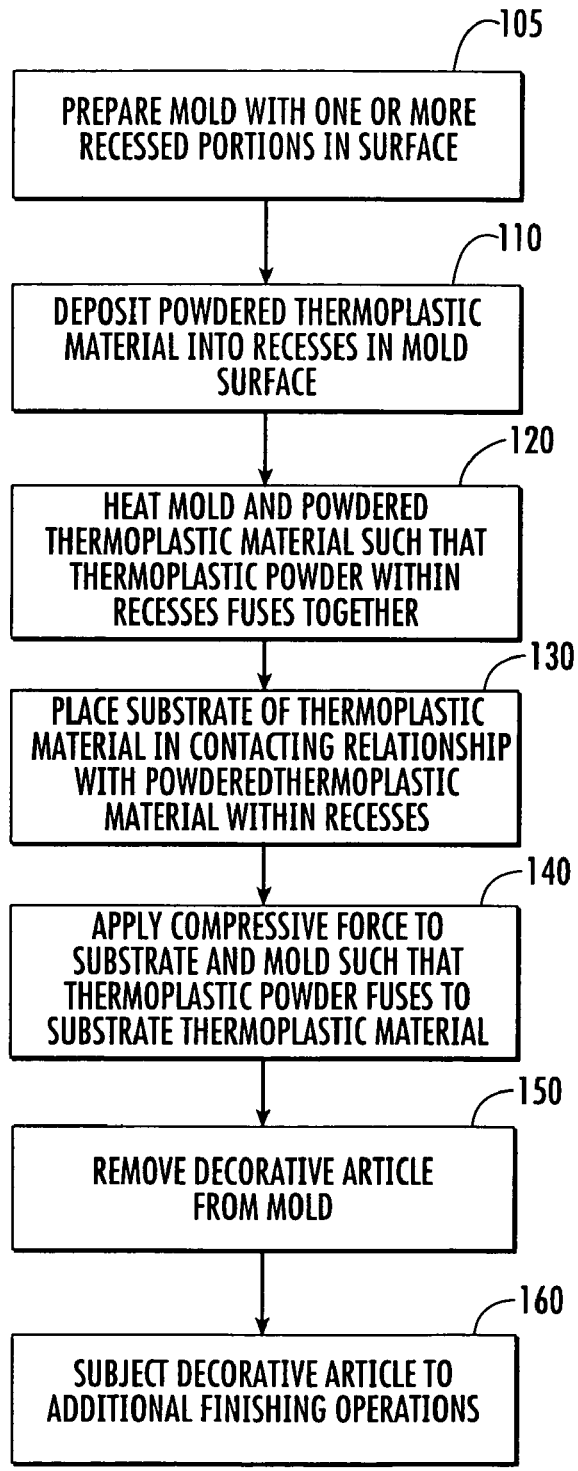
FIG. 1
FIG. 2

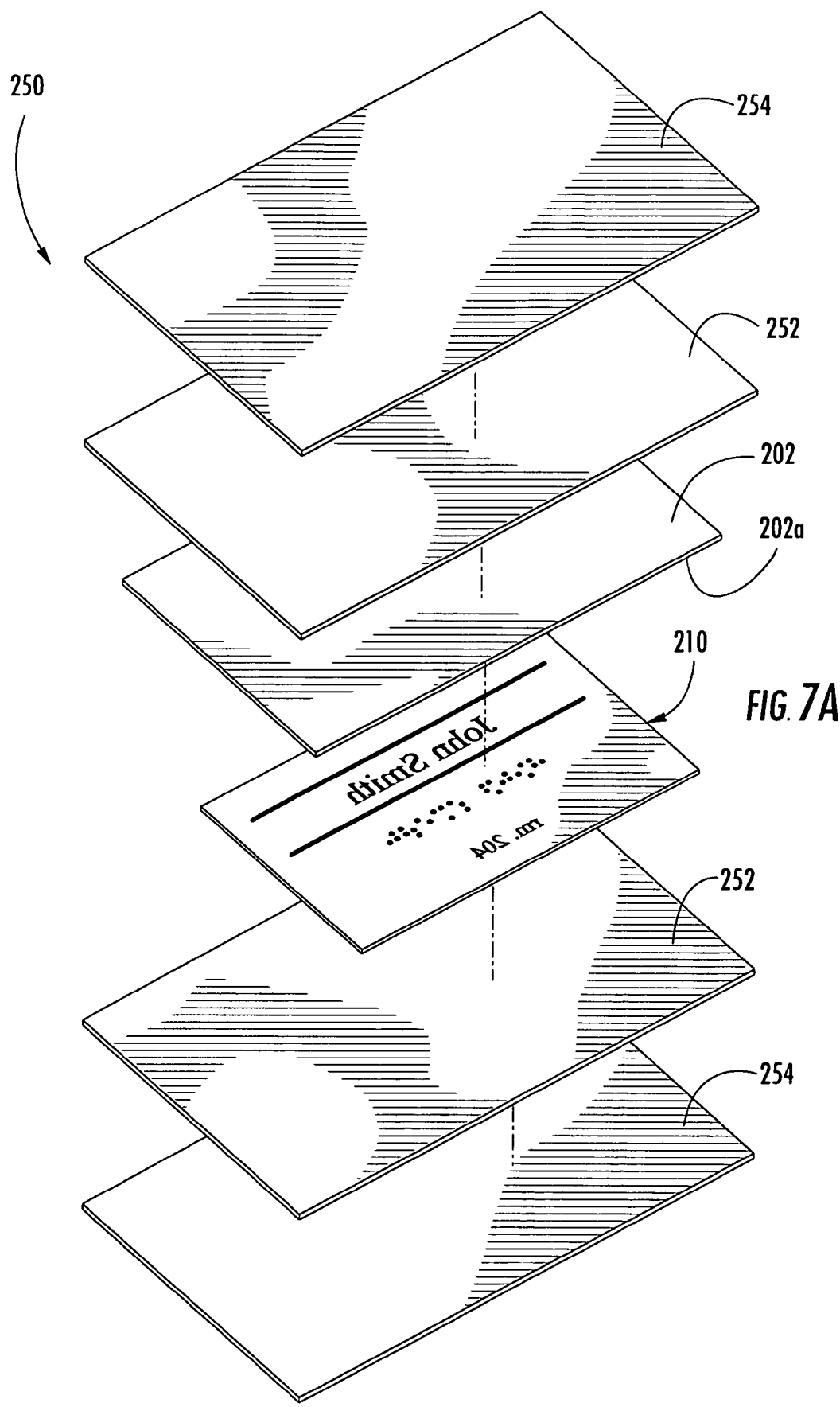

DECORATIVE ARTICLES WITH PORTIONS IN RELIEF AND METHODS OF MAKING SAME

FIELD OF THE INVENTION

The present invention relates generally to the fabrication of molded articles and, more particularly, to the fabrication of molded articles having relief portions extending therefrom.

BACKGROUND OF THE INVENTION

The Americans with Disabilities Act (ADA) has mandated that signs which are to be utilized for "permanent room identification" in public facilities are to have lettering which is to be raised at least 1/32 inch from the background of the sign. Further required by the ADA is the use of Grade II Braille on "permanent room identification" signs which is also to be raised at least 1/32 inch from the background of the sign.

Displays, such as signs, having raised characters or images (i.e., "relief" portions) with colors different from a background color thereof are known. Often, such displays are referred to as "one-off" displays because the raised characters and/or images are unique to each display. For example, hotels often mount a sign next to each room to indicate the number of each room. Because each room in a hotel conventionally has a unique number, each respective room number sign will be unique. Co-assigned U.S. Pat. No. 6,238,609 describes methods of producing one-off displays using thermosetting resins, and is incorporated herein by reference in its entirety.

A known method of fabricating displays with raised images and/or characters is to apply preformed characters or images of one color to a substrate of another color. Another known method is to produce an article having images or characters in relief therewith, and then to apply different colors to the raised portions, such as by painting, staining, silk-screening, and the like (often referred to as "tipping"). Unfortunately, these methods may be somewhat labor intensive and may be prone to fabrication errors. Furthermore, displays produced via conventional methods may be rendered aesthetically unpleasing as a result of wear or damage. For example, paint may chip off of a raised portion of a display or an attached raised portion may become detached from the display through wear and/or vandalism.

Displays with raised portions formed by casting a polymeric resin into a mold having one or more recesses can be adversely affected by resin shrinkage during the curing process. Shrinkage of raised portions during curing can induce shear stress that can damage the raised portions and/or display. In addition, displays with raised portions formed by casting a polymeric resin into a mold having one or more recesses can be adversely affected by the presence of air bubbles and voids. For example, polyester resin, by nature, holds air bubbles tenaciously.

Increasingly, displays are being fabricated with thermosetting polymeric resins because of the durability and longevity that thermosetting resins exhibit. Unfortunately, there are a number of issues that make thermosetting resins undesirable as a molding material. For example, because thermosetting resins require the use of various solvents, volatile organic chemicals (VOCs) are emitted during processing, which may present safety problems as well as environmental problems. In addition, thermosetting resins can be difficult to break down and recycle at the end of the life of a product incorporating them.

SUMMARY OF THE INVENTION

In view of the above discussion, a method of producing a decorative article, according to embodiments of the present invention, includes depositing a layer of powdered material onto a mold surface, wherein the powdered material includes thermoplastic powder, placing a substrate in contacting relationship with the layer of thermoplastic powder, applying a compressive force to the substrate and mold such that the thermoplastic powder becomes thermoformable without liquefying, and fuses to the substrate, and removing the article from the mold. The thermoplastic powder may be heated prior to applying a compressive force such that the thermoplastic powder fuses together.

According to embodiments of the present invention, a method of producing a decorative article having at least one relief portion extending therefrom includes depositing powdered thermoplastic material into one or more recesses formed within a mold surface, placing a substrate surface in contacting relationship with the mold surface, applying a compressive force to the substrate and mold such that the thermoplastic powder becomes thermoformable without liquefying, and fuses to the substrate, and removing the article from the mold. The thermoplastic powder may be heated prior to applying a compressive force such that the thermoplastic powder fuses together.

According to embodiments of the present invention, a decorative article includes a substrate having a surface of thermoplastic material, and one or more relief portions extending from the substrate surface. The one or more relief portions may be formed from powdered thermoplastic material, a blend of powdered thermoplastic materials, or a blend of powdered thermoplastic material and powdered non-thermoplastic material. Exemplary powdered non-thermoplastic materials include, but are not limited to, metals, glass, minerals, thermoset plastics, and combinations thereof. The powdered thermoplastic material fuses together and to the substrate thermoplastic material during molding operations.

Articles produced according to embodiments of the present invention may be advantageous because they are capable of retaining an aesthetically pleasing appearance even when damaged and subjected to wear and tear. Moreover, articles according to embodiments of the present invention are durable and can have relief portions with different color schemes than the substrate from which they extend.

Exemplary decorative articles produced by the above process include, but are not limited to, architectural facing, signs, displays, art objects and the like. Signs produced in accordance with the present invention are particularly suitable for use where a durable finish and surface is desired. Because the relief portions of an article produced in accordance with embodiments of the present invention have the same color throughout the thickness of the material, chips and other forms of wear do not have a detrimental appearance to the article.

Decorative articles may be produced to simulate almost any type of surface and may have almost any pattern and color scheme desired when produced according to the processes of the present invention. Furthermore, fabrication methods according to the present invention can be more efficient than paint inlay or overlay methods and can produce articles that are more authentic looking than articles with painted surfaces.

BRIEF DESCRIPTION OF THE DRAWINGS

The accompanying drawings, which are incorporated in and constitute a part of the specification, illustrate embodiments of the invention and, together with the description, serve to explain principles of the invention.

FIGS. 1-2 are flow charts of operations for producing articles, according to embodiments of the present invention.

FIG. 7A is an exploded perspective view of a "sandwich" containing the mold of FIG. 5 and a substrate to which the thermoplastic powder in the mold is to be fused.

DETAILED DESCRIPTION OF THE INVENTION

Figure 3:
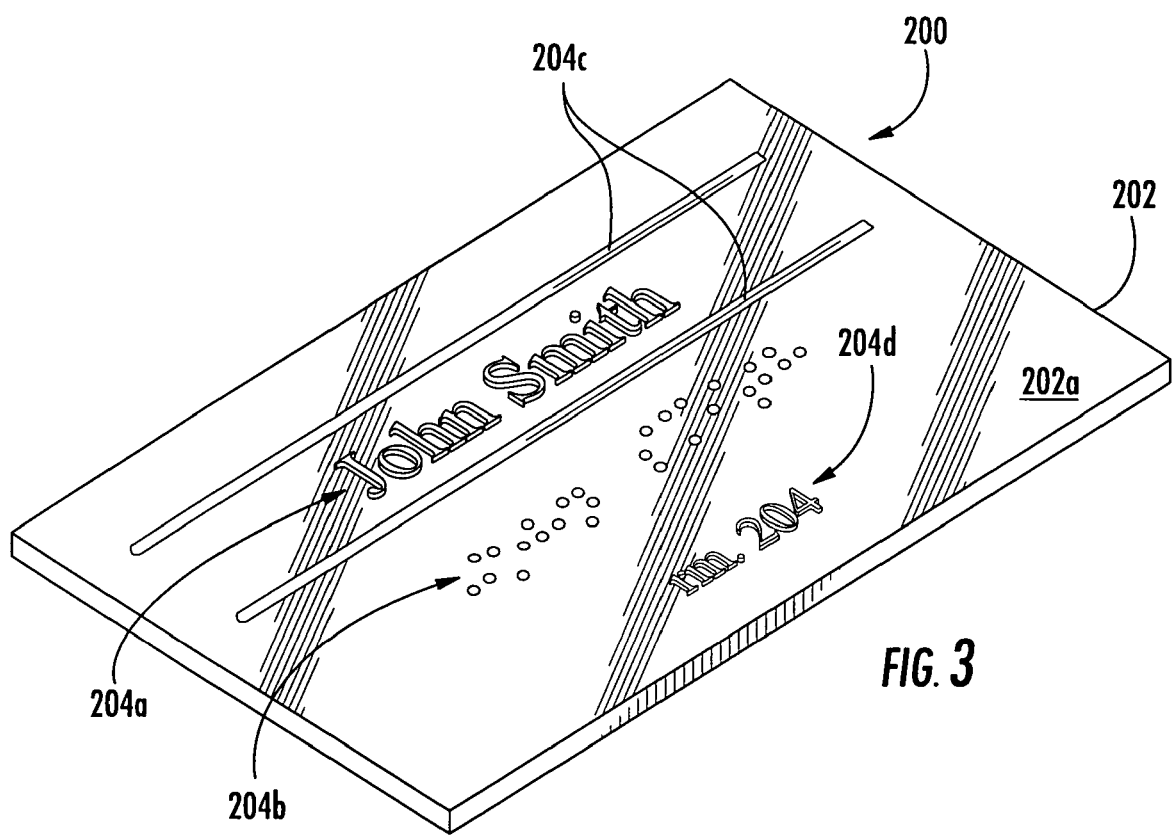
FIG. 3 is a perspective view of an article having a face and relief portions extending therefrom, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Solid surface articles have been available for over twenty years. The term "solid surface" relates to a material that has substantially the same physical and aesthetic properties throughout its thickness. Thus, if the surface of the material is sanded or planed, a substantially identical aesthetic is found. Solid surface materials are typically molded out of various thermosetting resins such as unsaturated polyester resins. Various aesthetics are produced such as solid color, marbleized color (see, for example, U.S. Pat. No. 5,166,230 to Stecker) and particulate dispersion (see, for example, U.S. Pat. No. 4,959,401 to Bellasalma et al.).

Referring now to FIG. 1, operations for producing a decorative solid surface article, according to embodiments of the present invention, are illustrated. A layer of powdered thermoplastic material is deposited onto a mold surface (Block 10). The powdered thermoplastic material may be virtually any type of thermoplastic material. Exemplary thermoplastic materials include, but are not limited to, acrylonitrile butadiene styrene, polyethylene, polyethylene terephthalate, polyethylene terephthalate glycol, polypropylene, polyolefin, poly vinyl chloride, acrylics, polycarbonates, styrenes, acetyls, polyvinyls, and combinations thereof. The powdered thermoplastic material may be a blend of multiple, different powdered thermoplastic materials. The powdered thermoplastic material may also have powdered non-thermoplastic material blended therewith. The powdered non-thermoplastic material may be virtually any type of non-thermoplastic material. Exemplary non-thermoplastic materials include, but are not limited to, metals, glass, minerals, thermoset plastics, and combinations thereof.

Prior to depositing the powdered thermoplastic material onto the mold surface, a release coating may be applied to the mold. Exemplary release coatings include, but are not limited to, silicon release agents, wax in the carnauba wax family, TEFLON® a trademark of the E.I. DuPont de Nemours Company, Wilmington, Del.), zinc stearate, or any similar material which will function as a release agent for the powdered thermoplastic material being used to create the decorative article, the selection of which is within the skill of one in the art.

The mold and powdered thermoplastic material may be heated such that the thermoplastic powder fuses together (e.g., transforms from powder to a spongy mass) on the mold surface (Block 20); however, this step is not always required. Heating the powdered thermoplastic material may be accomplished at various temperatures and for various time periods. An exemplary temperature is 280° F. and an exemplary time period is about fifteen minutes.

A substrate of thermoplastic material is placed in contacting relationship with the layer of powdered thermoplastic material (Block 30) and a compressive force is applied to the substrate and mold such that the thermoplastic powder becomes thermoformable without liquefying, and fuses to the substrate thermoplastic material (Block 40). The compressive force transforms the thermoplastic powder into a void-free solid mass. According to a particular embodiment of the present invention, compressive force is initially applied via a heated press, followed by the application of compressive force via a cool press (see FIGS. 8-9). For example, a compressive force of at least about 50 psi is applied to the substrate and mold at a temperature greater than about 280° F. for a first period of time, followed by applying a compressive force of at least about 50 psi to the substrate and mold at a temperature less than about 180° F. for a second period of time. Embodiments of the present invention are not limited to any particular ranges of temperatures or pressures. The decorative article is then removed from the mold (Block 50) and may be subjected to additional finishing operations, as needed (Block 60).

The substrate may be virtually any type of material with a thermoplastic material surface to which the powdered thermoplastic material fuses. Fusion may be facilitated by a layer of thermo-activatable adhesive. For example, the substrate may be wood, metal, plastic, glass, concrete, etc., or combinations thereof. The substrate may be composed entirely of thermoplastic material or blends of thermoplastic material. The substrate may be composed of thermoplastic material and one or more other non-thermoplastic materials. Exemplary thermoplastic materials include, but are not limited to, acrylonitrile butadiene styrene, polyethylene, polypropylene, polyolefin, poly vinyl chloride, acrylics, polycarbonates, styrenes, acetyls, polyvinyls, and combinations thereof. According to embodiments of the present invention, the substrate may include one or more textured surfaces. Furthermore, the substrate can be formed from various non-polymeric materials, such as plaster and concrete.

According to embodiments of the present invention, the substrate may include some type of decorative indicia thereon including, but not limited to, lettering, designs, characters, logos and other symbols. The term "lettering" as used herein includes, but is not limited to, alphabetical characters and alphanumeric characters. According to embodiments of the present invention, the powdered thermoplastic material and the substrate may have the same color or may have different colors. According to embodiments of the present invention, the powdered thermoplastic material may fuse to a substantially translucent or transparent state.

Various fillers, colorants, pigments and additives may be added to the powdered thermoplastic material. Exemplary fillers include, but are not limited to, alumina trihydrate, quartz powder, marble powder, crushed silica, calcium carbonate, clay, glass fibers, powdered metals, mixtures thereof and other mineral and inorganic particulates that contribute to the aesthetics of the final article. The fillers may be used in amounts of about 20 to about 300 percent by weight of thermoplastic powder. Various colorants and pigments can be added for purposes of providing background color and other aesthetically pleasing features. Other additives can include flame retardants, antioxidants, inhibitors (e.g., hydroquinone and benzoquinone), UV radiation absorbers and the like.

Referring now to FIG. 2, operations for producing a decorative solid surface article, according to other embodiments of the present invention, are illustrated. Initially, a mold is prepared having one or more recessed portions formed within a surface of the mold (Block 105). The recesses may be reversed images of, for example, a design, image, or alphanumeric character. Powdered thermoplastic material is deposited into the one or more recesses formed within a mold surface, and preferably such that the powder is not in contact with the mold surface (Block 110). Any powdered thermoplastic material that is in contact with the surface of the mold is removed. Furthermore, any dirt or foreign materials are also removed from the planar surface of the mold. The powdered thermoplastic material may be deposited into the recesses of the mold surface via a nozzle or any other known means of applying material, such as a doctor blade or squeegee.

As described above, the powdered thermoplastic material may be virtually any type of thermoplastic material. Exemplary thermoplastic materials include, but are not limited to, acrylonitrile butadiene styrene, polyethylene, polypropylene, polyolefin, poly vinyl chloride, acrylics, polycarbonates, styrenes, acetyls, polyvinyls, and combinations thereof. The powdered thermoplastic material may be a blend of multiple, different powdered thermoplastic materials. The powdered thermoplastic material may also have powdered non-thermoplastic material blended therewith. The powdered non-thermoplastic material may be virtually any type of non-thermoplastic material. Exemplary non-thermoplastic materials include, but are not limited to metals, glass, minerals, and combinations thereof. Prior to depositing the powdered thermoplastic material into the recesses of the mold surface, a release coating may be applied to the mold surface and recesses, as described above.

The mold and powdered thermoplastic material may be heated such that the thermoplastic powder within the one or more recesses fuses together (Block 120); however, this step is not required. Heating the powdered thermoplastic material may be accomplished at various temperatures and for various time periods.

Figure 8:
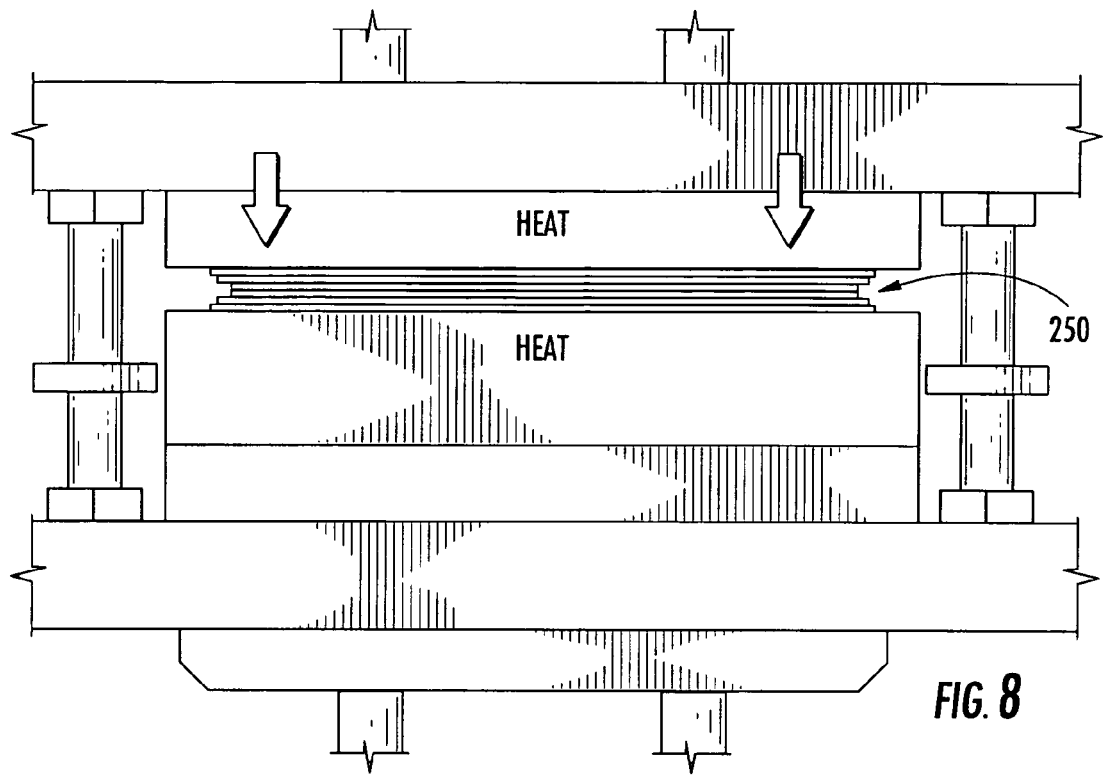
FIG. 8 is a side elevation view of a press wherein the sandwich of FIG. 7B is being compressed in the presence of heat, according to embodiments of the present invention.
Figure 9:
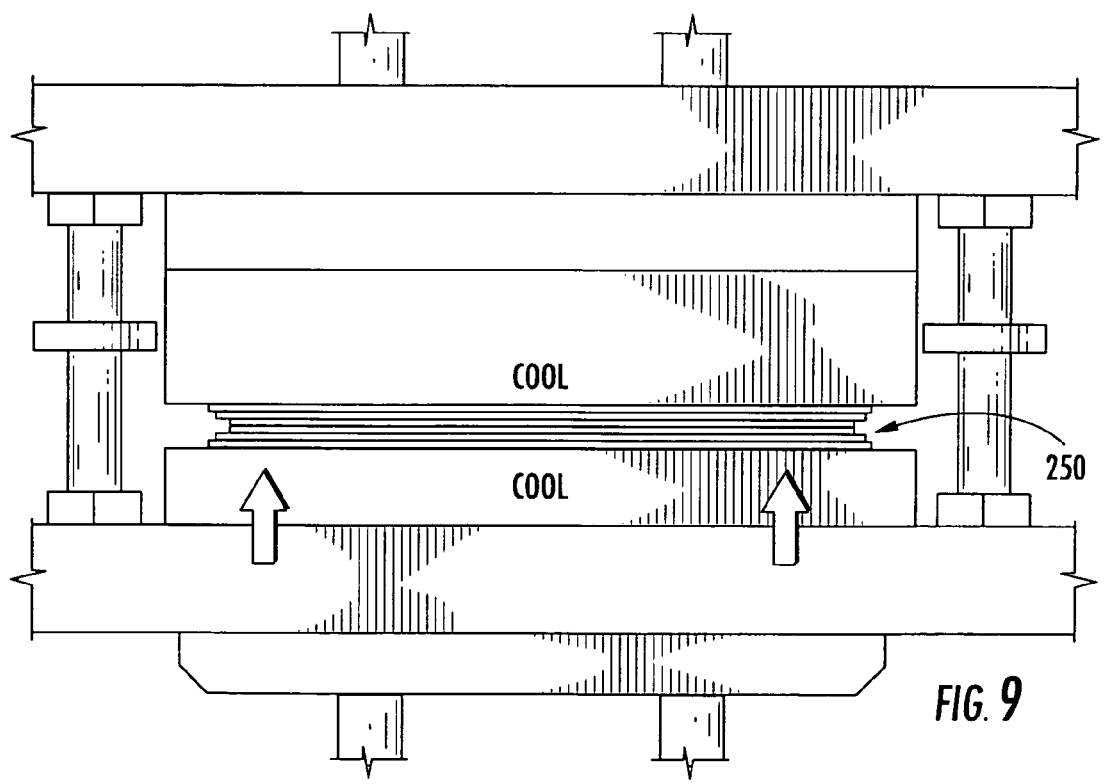
FIG. 9 is a side elevation view of a press wherein the sandwich of FIG. 7B is being compressed in the absence of heat, according to embodiments of the present invention.

A substrate of thermoplastic material is placed in contacting relationship with the mold surface and with the powdered thermoplastic material within the one or more recesses (Block 130) and a compressive force is applied to the substrate and mold such that the thermoplastic powder becomes thermoformable without liquefying, and fuses to the substrate thermoplastic material (Block 140). The compressive force transforms the powdered material into a void-free solid mass. According to a particular embodiment of the present invention, compressive force is initially applied via a heated press, followed by the application of compressive force via a cool press (FIGS. 8-9). For example, a compressive force of at least about 50 psi is applied to the substrate and mold at a temperature greater than about 280° F. for a first period of time, followed by applying a compressive force of at least about 50 psi to the substrate and mold at a temperature less than about 180° F. for a second period of time. Embodiments of the present invention are not limited to any particular ranges of temperatures or pressures.

As described above, the substrate may be virtually any type of material with a thermoplastic material surface to which the powdered thermoplastic material fuses. For example, the substrate may be wood, metal, plastic, glass, concrete, etc., or combinations thereof. The substrate may be composed entirely of thermoplastic material or blends of thermoplastic material. The substrate may be composed of thermoplastic material and one or more other non-thermoplastic materials. Exemplary thermoplastic materials include, but are not limited to, acrylonitrile butadiene styrene, polyethylene, polypropylene, polyolefin, poly vinyl chloride, acrylics, polycarbonates, styrenes, acetyls, polyvinyls, and combinations thereof. According to embodiments of the present invention, the substrate may include one or more textured surfaces. According to embodiments of the present invention, the substrate may include some type of decorative indicia thereon including, but not limited to, lettering, designs, characters, logos and other symbols. According to embodiments of the present invention, the powdered thermoplastic material and the substrate may have the same color or may have different colors. According to embodiments of the present invention, the powdered thermoplastic material may fuse to a substantially translucent or transparent state. Various fillers, colorants, pigments and additives may be added to the powdered thermoplastic material, as described above.

The decorative article having a surface with relief portions extending therefrom is then removed from the mold (Block 150) and may be subjected to additional finishing operations, as needed (Block 160).

Referring now to FIG. 3, a decorative solid surface article 200, according to an embodiment of the present invention, is illustrated. The decorative article 200 includes a substrate 202 having a surface 202*a* with various relief portions 204*a*-204*d* extending outwardly therefrom, as illustrated. For example, the illustrated relief portion 204*a* has the configuration of the name "John Smith". The illustrated relief portion 204*b* is a pattern of Braille characters corresponding to the name "John Smith". The illustrated relief portions 204*c* have the configurations of lines. The illustrated relief portion 204*d* has the configuration of the characters "rm. 204".

It is understood that articles of manufacture according to embodiments of the present invention may have relief portions extending therefrom with various shapes and configurations, including but not limited to images, alphanumeric characters, Braille and the like. Furthermore, the powdered material forming the relief portions 204*a*-204*d* may have the same or different color as the substrate surface 202*a*. For example, the relief portions 204*a*-204*d* may be formed from powdered material having a gray color and the substrate surface 202*a* may have any number of colors different from the gray color of the relief portions 204*a*-204*d*, such as red and green. Furthermore, the substrate 202 and/or relief portions 204*a*-204*d* may be transparent.

Figure 4:
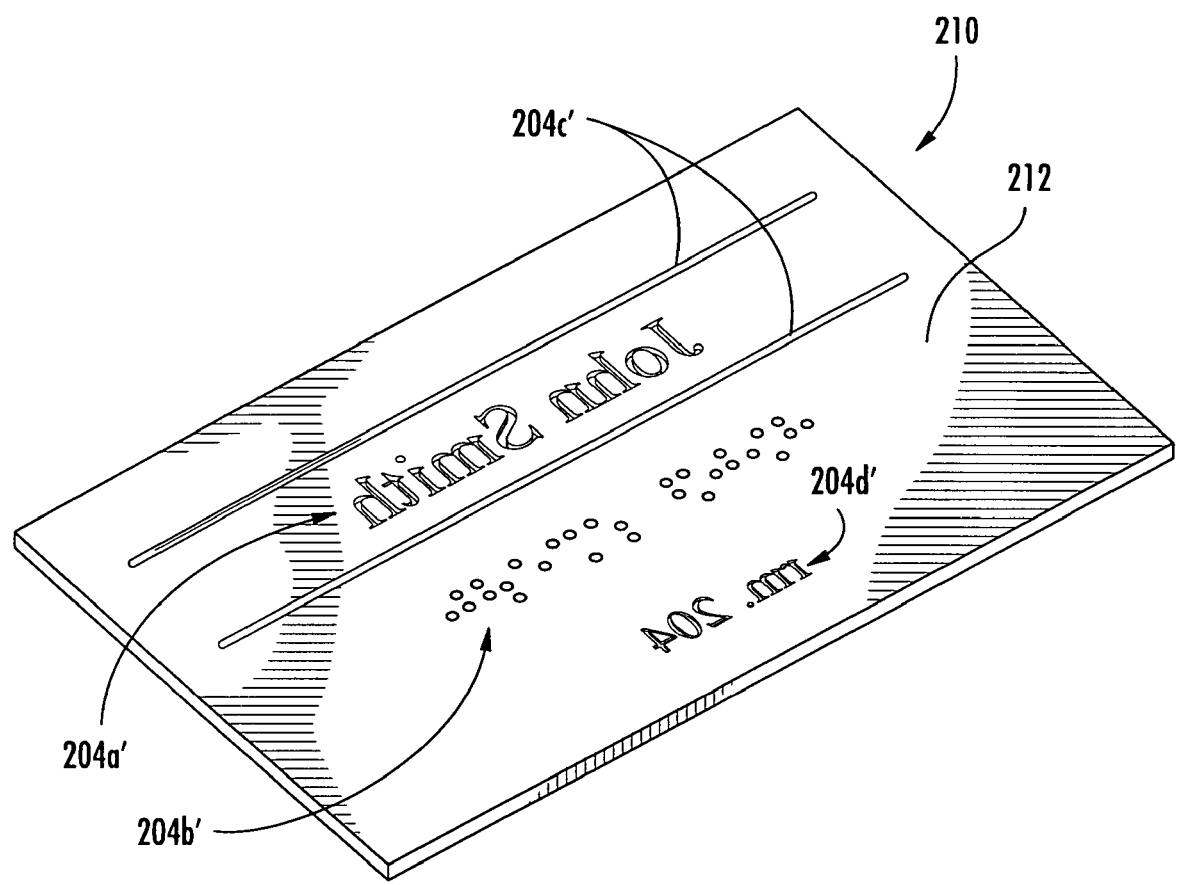
FIG. 4 is a perspective view of a mold for use in preparing articles, according to embodiments of the present invention.

Referring now to FIG. 4, a mold 210 for producing the decorative article of manufacture 200 shown in FIG. 3, according to embodiments of the present invention, is illustrated. The surface 212 of the mold 210 has a generally planar configuration with recess portions 204*a'*-204*d'* formed therein, as illustrated. Recess portions 204*a'*-204*d'* are configured to form the respective relief portions 204*a*-204*d* in the article 200 as will be described below. In the illustrated embodiment, recess portion 204*a'* has the reversed configuration of the name "John Smith" (204*a*). Recess portion 204*b'* has the reversed configuration of Braille characters 204*b*. Recess portions 204*c'* have reversed configurations of lines 204*c*. Recess portion 204*d'* has the reversed configuration of the characters "rm. 204" (204*d*).

It is understood that other mold sizes, shapes, and configurations may be utilized to produce decorative articles having raised portions according to the present invention, without limitation. For example, mold surface 212 may have various shapes and configurations and need not be planar. In the illustrated embodiment, the mold 210 is configured to produce a decorative sign of the type utilized to identify offices. However, molds for producing articles of manufacture according to embodiments of the present invention may have any shape, pattern, and configuration desired, the selection of which will be within the purview of one skilled in the art.

Molds utilized in producing articles of manufacture according to the present invention may be made from various materials including, but not limited to aluminum, steel, fiberglass composite, etc., and may be cast or machined to produce the decorative pattern, as would be understood by those skilled in the art. In addition, molds may be formed from flexible material. The illustrated mold 210, including the surface 212 and the reverse-image recesses 204*a'*-204*d'* formed therein, may be designed and created under computer control. Preferably, the decorative patterns, alphanumeric characters, Braille characters, etc. are designed and stored on a computer. In addition, the processes or portions thereof described herein may be under computer control. For patterns and designs which do not lend themselves to computer-assisted machining, traditional mold and pattern making methods can be used. Sculpting and texture transfer to molds are examples.

Figure 5:
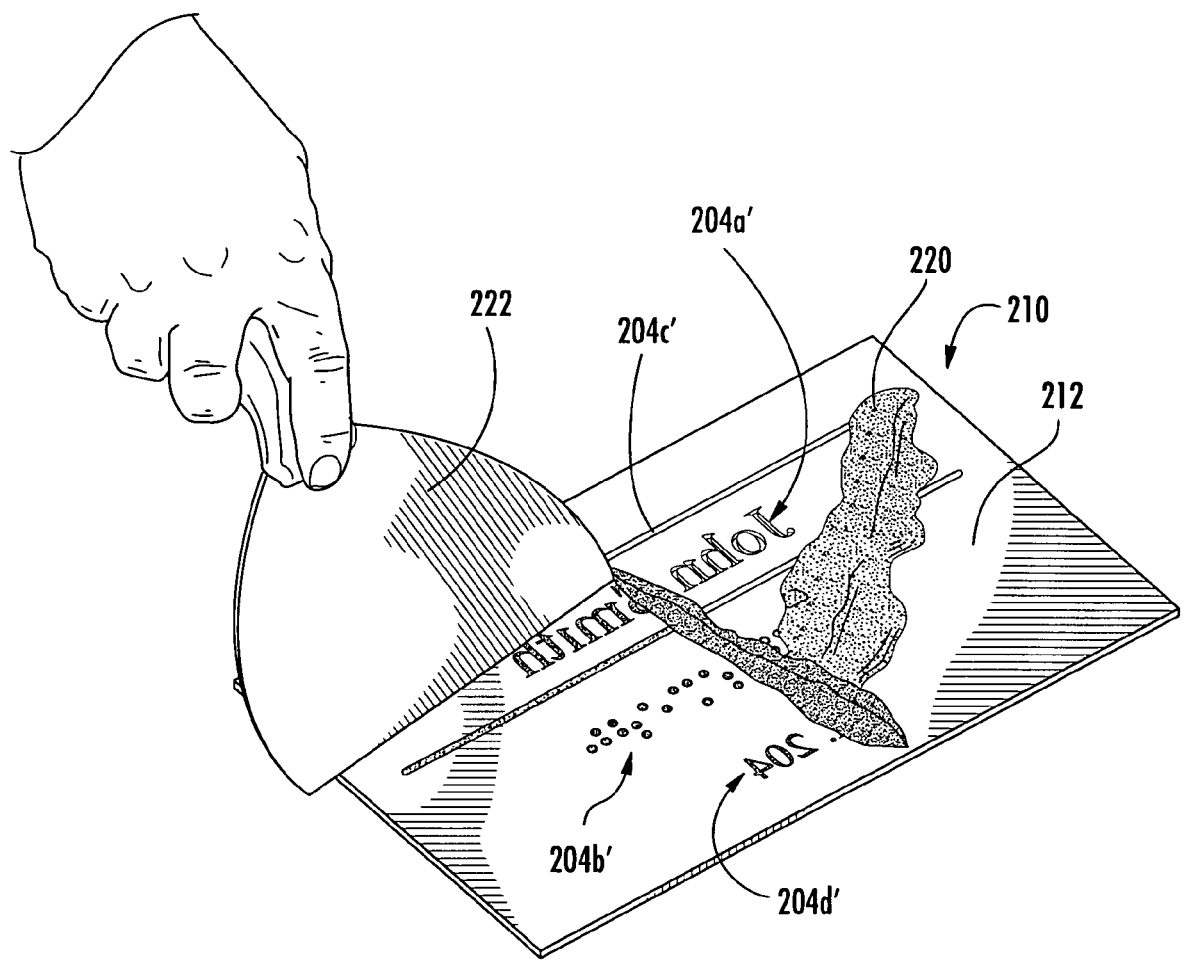
FIG. 5 illustrates powdered thermoplastic material being applied to the mold of FIG. 4 so as to fill the various recesses in the mold.

Referring to FIG. 5, a powdered thermoplastic material 220 is illustrated being cast into the mold recesses 204*a'*-204*d'* via a doctor blade 222. However, the powdered material 220 may be cast into the recesses 204*a'*-204*d'* of the mold surface 212 in any of numerous ways, as would be understood by one skilled in the art. Throughout the processes of the present invention, powdered material may be applied in various ways, and is not limited to the doctor blade 222 schematically illustrated in the drawings. After, the mold recesses 204*a'*-204*d'* are filed with the powdered material 220, excess powdered material 220 remaining on the mold surface 212 is removed.

Figure 6:
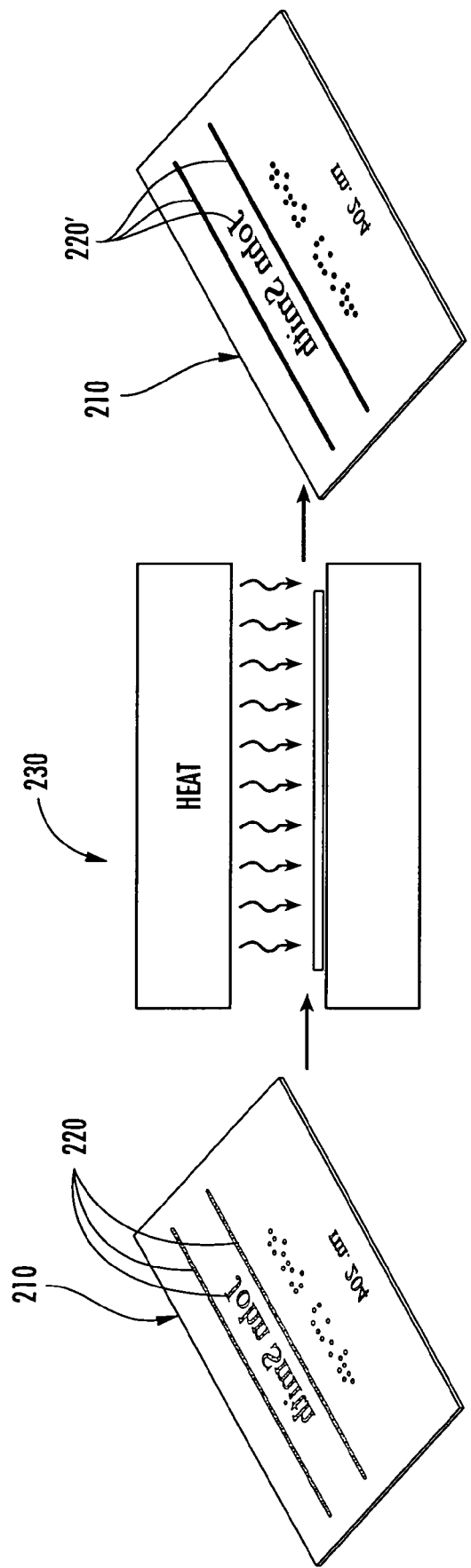
FIG. 6 illustrates heating the mold of FIG. 5 such that the powdered thermoplastic material fuses together.

According to embodiments of the present invention illustrated in FIG. 6, the mold 210 with the powdered thermoplastic material 220 deposited within the various recesses 204a'-204d' may be placed within an oven 230 and heated for a period of time sufficient to cause the powdered material 220 to fuse (indicated by 220') within the recesses 204a'-204d'. When fused, the material within the recesses no longer is in a powdered state, but is a spongy mass. As described above, this step is not required.

Figure 7B:
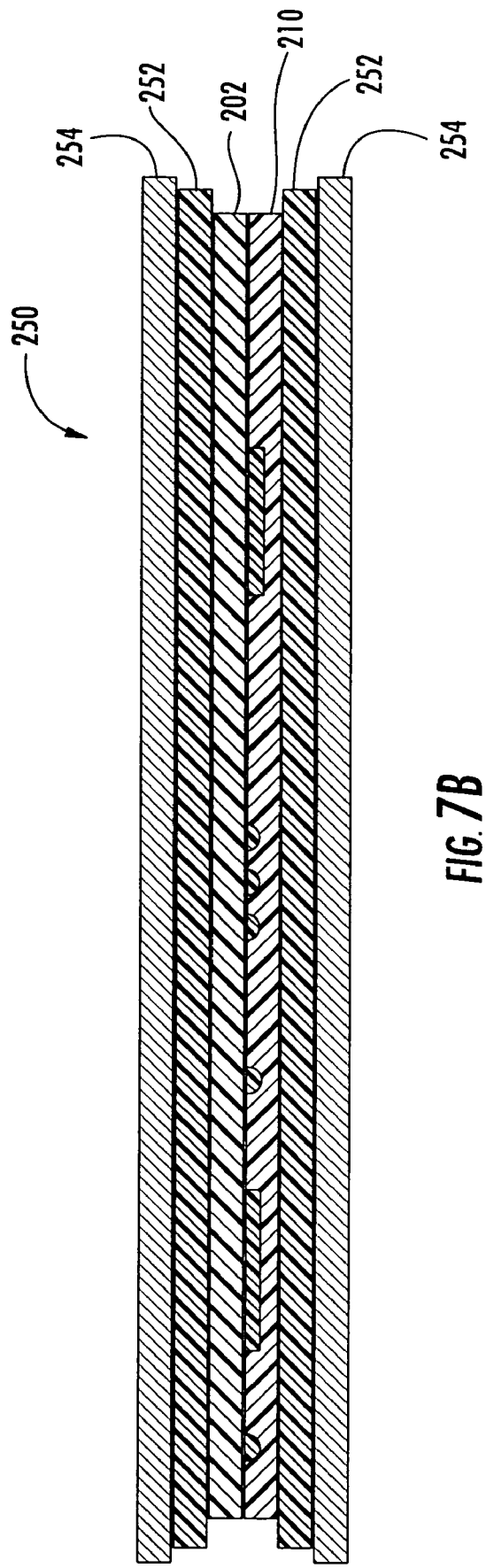
FIG. 7B is a side elevation view of the sandwich of FIG. 7A.

Referring now to FIGS. 7A-7B, a substrate 202 having at least a surface 202a of thermoplastic material is placed in contacting relationship with the mold surface 212 and with the powdered thermoplastic material 220 within the recesses 204a'-204d'. A "sandwich" 250 is then built which includes insulating substrates 252 and thermally conductive substrates 254, as illustrated. The thermally conductive substrates 254 help direct heat to the mold and substrate during pressing operations. The insulating substrates 252 help control the transfer of heat between the thermally conductive substrates 254 and the mold 210 and substrate 202.

The sandwich 250 is then placed within a press and a compressive force is applied to the sandwich 250 and, thus, to the substrate 202 and mold 210 such that the powdered thermoplastic material 220 (or fused thermoplastic material 220') fuses to the thermoplastic material of the substrate 202 as well as being transformed from a spongy mass to a void-free solid mass. According to embodiments of the present invention illustrated in FIGS. 8-9 and described above, compressive force is initially applied to the sandwich 250 via a heated press (FIG. 8), followed by the application of compressive force via a cool press (FIG. 9).

Figure 10:
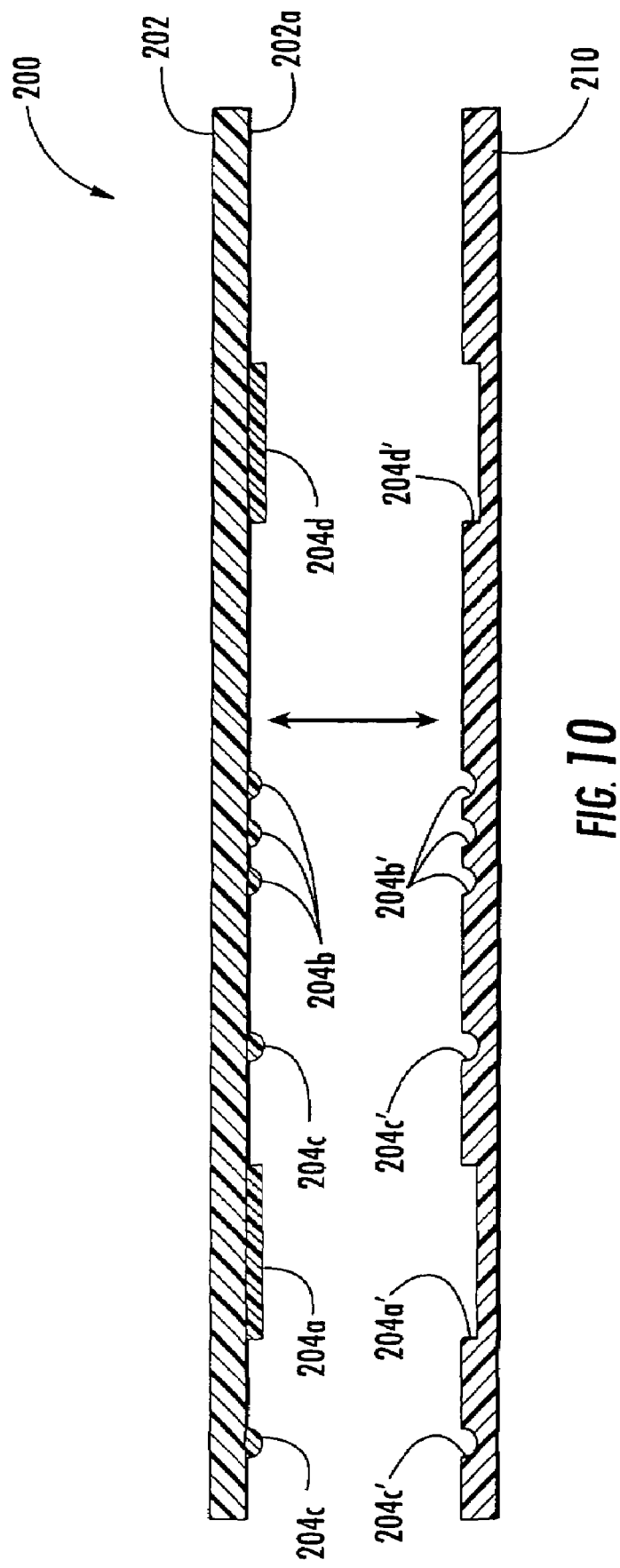
FIG. 10 is a side elevation view of an article being separated (demolded) from the mold after molding operations.
Figure 11:
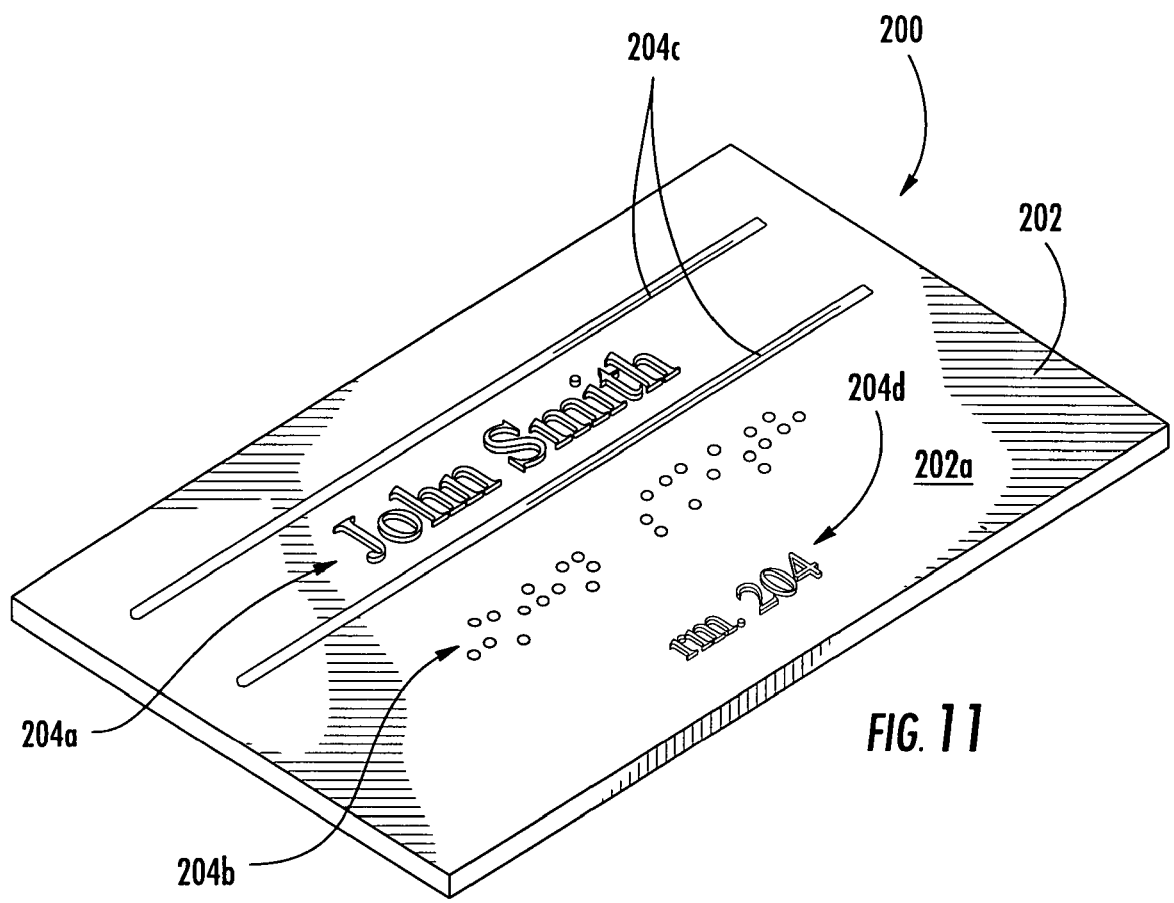
FIG. 11 is a front perspective view of the demolded article of FIG. 10.

After sufficient time, the sandwich 250 is removed from the press and the decorative article 200 and mold 210 are separated from each other, as illustrated in FIG. 10. After separation, the decorative article 200 may be placed between wooden sheets or other flat substrates (not shown) to help maintain flatness during cooling. Additional steps known to those skilled in the art, such as polishing, may include subjecting the decorative article exposed surface 202a and/or the relief portions 204a-204d to sanding or other post-casting/curing operations sufficient to produce a finished product.

Figure 12:
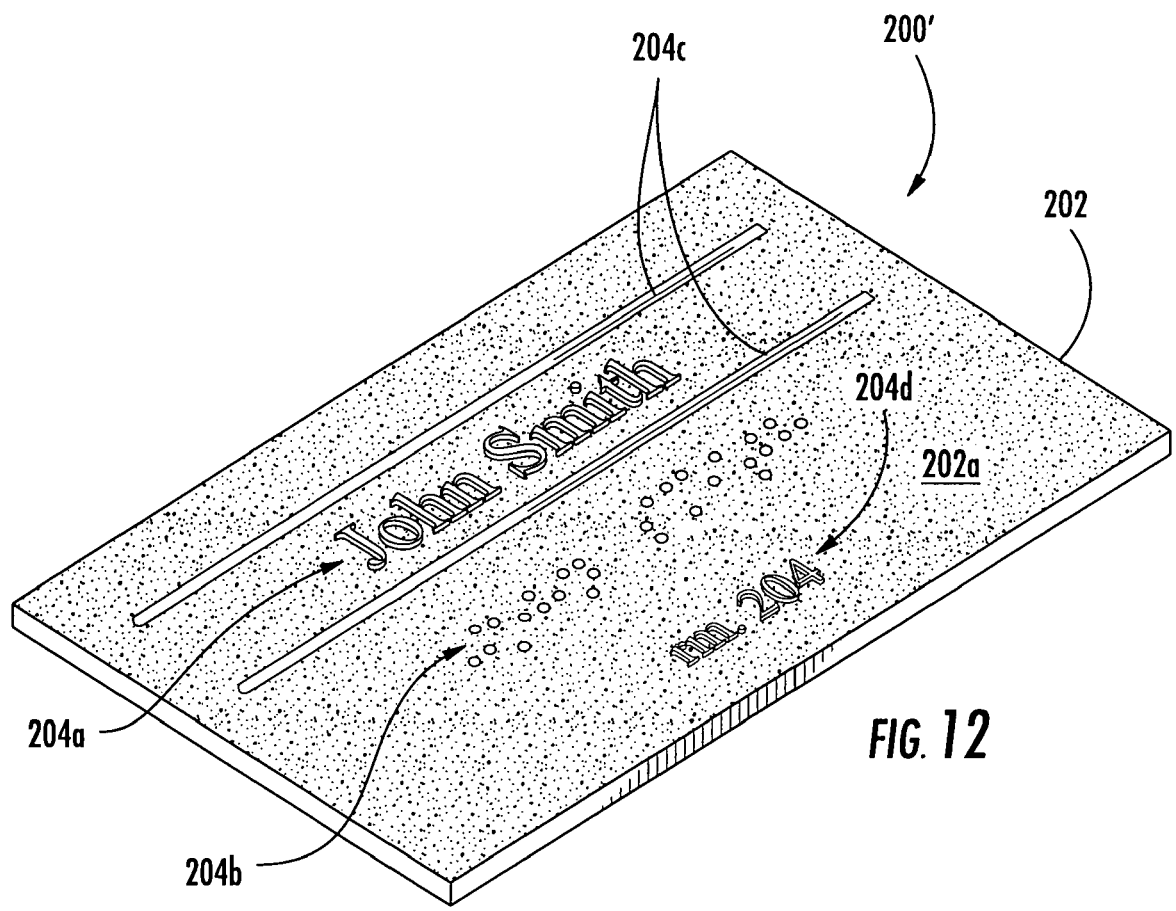
FIG. 12 is a front perspective view of an article according to an embodiment of the present invention wherein the substrate surface has a different color/pattern from that of the relief portions.

FIG. 12 is a front perspective view of a decorative article 200' according to an embodiment of the present invention wherein the substrate surface 202a has a different color/pattern from that of the relief portions 204a-204d.

Figure 13:
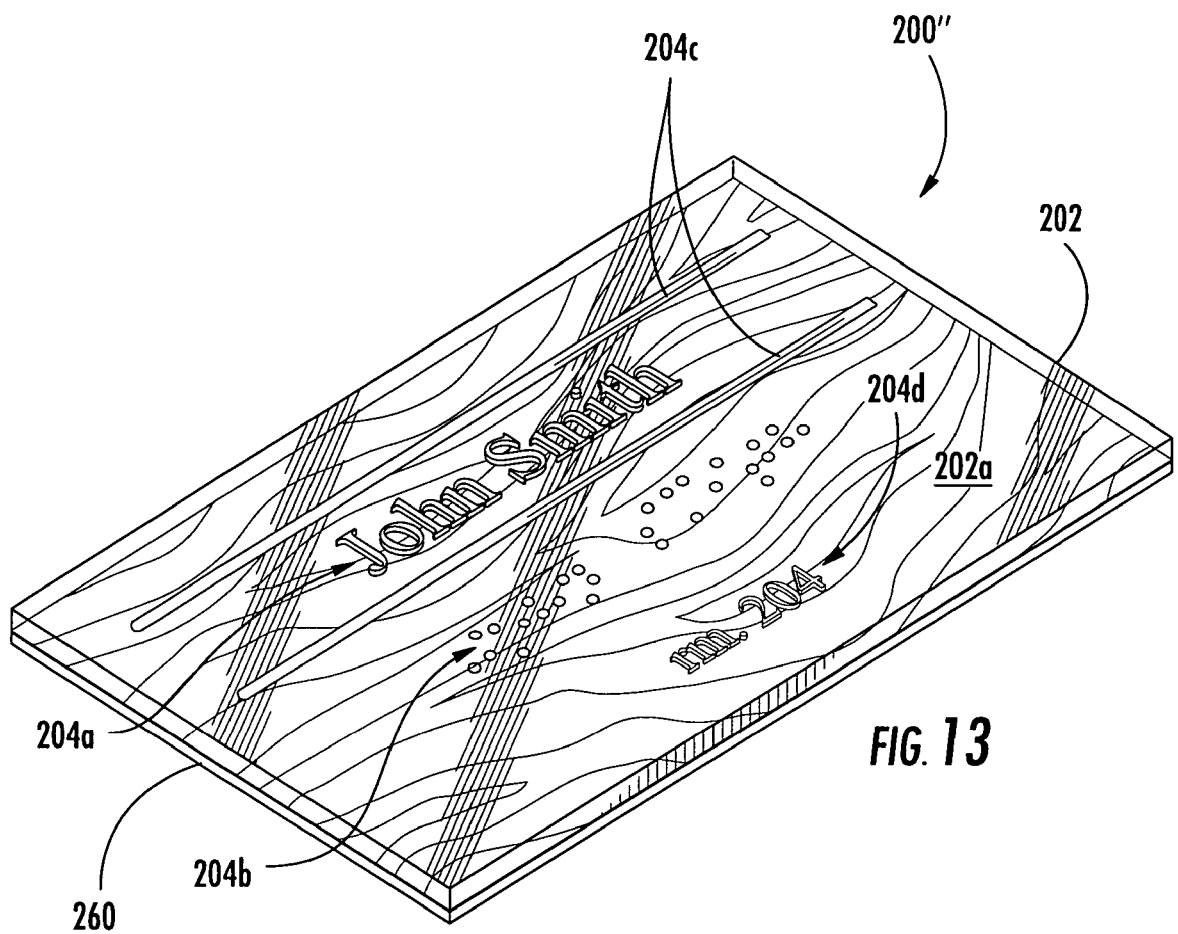
FIG. 13 is a front perspective view of an article according to an embodiment of the present invention wherein the substrate is transparent thereby allowing an underlying substrate to be visible therethrough.

FIG. 13 is a front perspective view of a decorative article 200" according to an embodiment of the present invention wherein the substrate 202 is transparent thereby allowing an underlying substrate 260 to be visible therethrough.

EXAMPLES

Example 1

A flat mold surface was prepared from a FORMICA® brand high pressure laminate measuring 24"×30"×0.050". Acrylic powder was prepared by pulverizing Cyro acrylate brand extruded sheet (black) to 100 mesh and finer powder. The powder was dusted onto the planer mold surface to approximately 0.010" thickness. The mold was placed in a convection oven for 10 minutes at 325° F. Powder fused to "crumbcake". The mold was then removed from the oven and a white Cyro Acrylate Acrylic sheet measuring 24"×30"× 0.250" was placed on the coated mold surface. A second FORMICA® high pressure laminate sheet measuring 24"× 30"×0.050" was placed on previous pile to produce a four layer "sandwich". The sandwich was placed in hydraulic press heated to 315° F. at a pressure of 100 psi. for 3 min. The sandwich was moved to a cooling clamp for a period of 3 minutes at 100 psi. The part was demolded from the mold and cooled to less than 150° F. The finished part is a laminated panel with a white substrate and a black coating approximately 0.005".

Example 2

A planer mold was prepared from a FORMICA® brand high pressure laminate measuring 24"×30"×0.050". Graphics were machined into the laminate surface to a depth of 0.030" with a CNC router. Graphics are reversed so that part will read correctly. The mold was is coated with liquid silicon or TEFLON®-type mold release.

A powder was prepared consisting of 50% by volume clear acrylic powder (Clear Cyro Acrylate FF pulverized to 120 mesh and finer) and 50% powdered brass (US Bronze Powders B-128). The homogenized mixture was then "doctor bladed" into mold recesses. The mold was placed into convection oven at 325° F. and heated for 10 minutes, causing the powders to fuse into a spongy solid.

The mold was removed from oven and cooled to 150° F. or less. Excess powder was wiped from planer surface of mold. The spongy mass remained in the mold cavities. A white acrylic sheet as in Example 1 was placed over mold face and a second FORMICA® high pressure laminate sheet measuring 24"×30"×0.050" was placed on previous pile to produce a four layer sandwich. The four layer sandwich was placed in hydraulic hot press at 315° F. and 500 psi for 3 minutes. The powder softens, compacts and fuses to planer surface of acrylic sheet. The assembly was moved to a cooling clamp and held under 100 psi for 3 minutes or until below 150° F.

Part was peeled from mold. The raised metallic composite was then polished with traditional methods.

Example 3

A planer mold was prepared from a FORMICA® brand high pressure laminate measuring 24"×30"×0.050". Graphics were machined into the laminate surface to a depth of 0.030" with a CNC router. Graphics were reversed so that part will read correctly. Mold was coated with liquid silicon or TEFLON®-type mold release.

A powder was prepared consisting of clear Cyro Acrylate FF pulverized to 100 mesh and finer. The mold cavities were then filled with the powder with a doctor blade. The assembly was prepared as in Example 2 except a clear acrylic sheet was used. The assembly was placed in oven for 30 minutes at 330° F. The assembly was transferred to unheated hydraulic press and pressed at 500 psi for 3 minutes or until cooled to less than 150° F. The finished part was removed from mold.

Example 4

Same as in Example 2, except powder was pigmented variant of Cyro FF acrylic or equivalent.

Example 5

Same as in Example 4 except assembly includes an additional 0.125" thick contrasting color acrylic sheet behind white sheet. Resulting part has pigmented text white face and bi-colored substrate.

Example 6

Same as in Example 1 except powder deposited on mold surface was of metal/acrylic composition used for infill in Example 2.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of producing a decorative article of manufacture, comprising:
   depositing a layer of powder onto a mold surface, wherein the powder comprises thermoplastic powder;
   placing a substrate in contacting relationship with the layer of thermoplastic powder, wherein the substrate comprises thermoplastic material;
   heating the thermoplastic powder such that the thermoplastic powder fuses together;
   applying a compressive force to the substrate and mold such that the thermoplastic powder becomes thermoformable without liquefying, and fuses to the substrate thermoplastic material; and
   removing the article of manufacture from the mold.

2. The method of claim 1, wherein the thermoplastic powder is heated to a temperature greater than about 280° F. for about fifteen minutes.

3. A method of producing a decorative article of manufacture, comprising:
   depositing a layer of powder onto a mold surface, wherein the powder comprises thermoplastic powder;
   placing a substrate in contacting relationship with the layer of thermoplastic powder, wherein the substrate comprises thermoplastic material;
   applying a compressive force to the substrate and mold such that the thermoplastic powder becomes thermoformable without liquefying, and fuses to the substrate thermoplastic material, wherein applying a compressive force to the substrate and mold comprises:
   applying a compressive force of at least about 50 psi to the substrate and mold at a temperature greater than about 280° F. for a first period of time; and
   applying a compressive force of at least about 50 psi to the substrate and mold at a temperature less than about 180° F. for a second period of time; and
   removing the article of manufacture from the mold.

4. A method of producing a decorative article of manufacture, comprising:
   depositing a layer of powder onto a mold surface, wherein the powder comprises thermoplastic powder and powdered non-thermoplastic material blended therewith;
   placing a substrate in contacting relationship with the layer of thermoplastic powder, wherein the substrate comprises thermoplastic material;
   applying a compressive force to the substrate and mold such that the thermoplastic powder becomes thermoformable without liquefying, and fuses to the substrate thermoplastic material; and
   removing the article of manufacture from the mold.

5. The method of claim 4, wherein the powdered non-thermoplastic material is selected from the group consisting of metals, glass, minerals, thermoset plastics, and combinations thereof.

6. The method of claim 1, wherein the thermoplastic powder comprises material selected from the group consisting of acrylonitrile butadiene styrene, polyethylene, polypropylene, polyolefin, poly vinyl chloride, acrylics, polycarbonates, styrenes, acetyls, polyvinyls, and combinations thereof.

7. The method of claim 1, wherein the substrate comprises thermoplastic material selected from the group consisting of acrylonitrile butadiene styrene, polyethylene, polypropylene, polyolefin, poly vinyl chloride, acrylics, polycarbonates, styrenes, acetyls, polyvinyls, and combinations thereof.

8. A method of producing a decorative article of manufacture, comprising:
   depositing a layer of powder onto a mold surface, wherein the powder comprises a blend of multiple, different powdered thermoplastic materials;
   placing a substrate in contacting relationship with the layer of thermoplastic powder, wherein the substrate comprises thermoplastic material;
   applying a compressive force to the substrate and mold such that the thermoplastic powder becomes thermoformable without liquefying, and fuses to the substrate thermoplastic material; and
   removing the article of manufacture from the mold.

9. A method of producing a decorative article of manufacture, comprising:
   depositing a layer of powder onto a mold surface, wherein the powder comprises thermoplastic powder;
   placing a substrate in contacting relationship with the layer of thermoplastic powder, wherein the substrate comprises thermoplastic material, wherein the powder and substrate have different colors;
   applying a compressive force to the substrate and mold such that the thermoplastic powder becomes thermoformable without liquefying, and fuses to the substrate thermoplastic material; and
   removing the article of manufacture from the mold.

10. A method of producing a decorative article of manufacture, comprising:
    depositing a layer of powder onto a mold surface, wherein the powder comprises thermoplastic powder;
    placing a substrate in contacting relationship with the layer of thermoplastic powder, wherein the substrate comprises thermoplastic material;
    applying a compressive force to the substrate and mold such that the thermoplastic powder becomes thermoformable without liquefying, and fuses in a transparent state to the substrate thermoplastic material; and
    removing the article of manufacture from the mold.

11. A method of producing a decorative article of manufacture, comprising:
    depositing a layer of powder onto a mold surface, wherein the powder comprises thermoplastic powder;
    placing a substrate in contacting relationship with the layer of thermoplastic powder, wherein the substrate comprises thermoplastic material and indicia;

applying a compressive force to the substrate and mold such that the thermoplastic powder becomes thermoformable without liquefying, and fuses to the substrate thermoplastic material; and removing the article of manufacture from the mold.

12. A method of producing a decorative article of manufacture, comprising:
   depositing a layer of powder onto a mold surface, wherein the powder comprises thermoplastic powder;
   placing a substrate in contacting relationship with the layer of thermoplastic powder, wherein the substrate comprises thermoplastic material and one or more textured surfaces;
   applying a compressive force to the substrate and mold such that the thermoplastic powder becomes thermoformable without liquefying, and fuses to the substrate thermoplastic material; and
   removing the article of manufacture from the mold.

13. A method of producing a decorative article of manufacture having at least one relief portion extending therefrom, the method comprising:
   depositing powder into one or more recesses formed within a mold surface, such that the powder is not in contact with the mold surface, wherein the powder comprises thermoplastic material;
   placing a substrate surface in contacting relationship with the mold surface, wherein the substrate comprises thermoplastic material;
   applying a compressive force to the substrate and mold such that the thermoplastic powder becomes thermoformable without liquefying, and fuses to the substrate thermoplastic material; and
   removing the article of manufacture from the mold.

14. The method of claim 13, further comprising heating the thermoplastic powder such that the thermoplastic powder fuses together prior to applying a compressive force to the substrate and mold.

15. The method of claim 14, wherein the thermoplastic powder is heated to a temperature greater than about 280° F. for about fifteen minutes.

16. The method of claim 13, wherein applying a compressive force to the substrate and mold comprises:
   applying a compressive force of at least about 50 psi to the substrate and mold at a temperature greater than about 280° F. for a first period of time; and
   applying a compressive force of at least about 50 psi to the substrate and mold at a temperature less than about 180° F. for a second period of time.

17. The method of claim 13, wherein the thermoplastic powder comprises powdered non-thermoplastic material blended therewith.

18. The method of claim 17, wherein the powdered non-thermoplastic material is selected from the group consisting of metals, glass, minerals, thermoset plastics, and combinations thereof.

19. The method of claim 13, wherein the thermoplastic powder comprises material selected from the group consisting of acrylonitrile butadiene styrene, polyethylene, polypropylene, polyolefin, poly vinyl chloride, acrylics, polycarbonates, styrenes, acetyls, polyvinyls, and combinations thereof.

20. The method of claim 13, wherein the substrate comprises thermoplastic material selected from the group consisting of acrylonitrile butadiene styrene, polyethylene, polypropylene, polyolefin, poly vinyl chloride, acrylics, polycarbonates, styrenes, acetyls, polyvinyls, and combinations thereof.

21. The method of claim 13, wherein the thermoplastic powder comprises a blend of multiple, different powdered thermoplastic materials.

22. The method of claim 13, wherein the powder and substrate have different colors.

23. The method of claim 13, wherein the thermoplastic powder fuses to a transparent state.

24. The method of claim 13, wherein the substrate comprises indicia.

25. The method of claim 13, wherein the substrate comprises one or more textured surfaces.

26. The method of claim 13, wherein the one or more recesses comprises a configuration of a respective alphanumeric character.

* * * * *